United States Patent
Yoshikawa et al.

(10) Patent No.: US 7,629,282 B2
(45) Date of Patent: Dec. 8, 2009

(54) ALUMINUM NITRIDE SINTERED BODY, SEMICONDUCTOR MANUFACTURING DEVICE AND METHOD OF MANUFACTURING

(75) Inventors: Jun Yoshikawa, Champaign, IL (US); Yoshimasa Kobayashi, Nagoya (JP); Naohito Yamada, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 57 days.

(21) Appl. No.: 11/724,049

(22) Filed: Mar. 14, 2007

(65) Prior Publication Data

US 2007/0215840 A1 Sep. 20, 2007

(30) Foreign Application Priority Data

Mar. 20, 2006 (JP) ............................... 2006-076680

(51) Int. Cl.
*C04B 35/581* (2006.01)
(52) U.S. Cl. ..................................... 501/98.4; 501/98.5
(58) Field of Classification Search ................ 501/98.4, 501/98.5
See application file for complete search history.

(56) References Cited

U.S. PATENT DOCUMENTS

| 6,001,760 | A | 12/1999 | Katsuda et al. | |
|---|---|---|---|---|
| 6,607,836 | B2 | 8/2003 | Katsuda et al. | |
| 6,919,287 | B2* | 7/2005 | Teratani et al. | 501/98.4 |
| 7,122,490 | B2* | 10/2006 | Kobayashi et al. | 501/98.4 |
| 7,148,166 | B2* | 12/2006 | Teratani et al. | 501/98.4 |

FOREIGN PATENT DOCUMENTS

| JP | 09-315867 A1 | 12/1997 |
|---|---|---|
| JP | 2003-055052 A1 | 2/2003 |

\* cited by examiner

*Primary Examiner*—Karl E Group
(74) *Attorney, Agent, or Firm*—Burr & Brown

(57) ABSTRACT

A conductive channel formed of an $(Sm, Ce)Al_{11}O_{18}$ is interconnected in grain boundaries of aluminum nitride (AlN) particles, thereby reducing the temperature dependency of the volume resistivity of an AlN sintered body formed therefrom. At the same time, a solid solution of the AlN particles is formed with at least one of C and Mg, to prevent the conductive channel from moving into the AlN particles, thereby maintaining a high volume resistivity within the AlN particles even at a high temperature.

12 Claims, 4 Drawing Sheets

ALUMINUM NITRIDE SINTERED BODY, SEMICONDUCTOR MANUFACTURING DEVICE AND METHOD OF MANUFACTURING

CROSS REFERENCE TO RELATED APPLICATION

This application is based upon and claims the benefit of priority from a Japanese Patent Application No. TOKUGAN 2006-76680, filed on Mar. 20, 2006; the entire contents of which are incorporated herein by reference.

BACKGROUND OF THE INVENTION

1. Field of the Invention

The present invention relates to an aluminum nitride sintered body suitable for use in a member for a semiconductor-manufacturing device such as a substrate material for an electrostatic chuck, and a method of manufacturing the same.

2. Description of the Related Art

Since aluminum nitride (AlN) exhibits high corrosion resistance to a halogen gas, it has been widely used as a material for a substrate of an electrostatic chuck. In the electrostatic chuck using a Johnson-Rahbek force, a material for the substrate desirably has a volume resistivity of about $10^8$ to $10^{12}$ $\Omega \cdot cm$ in order to attain a high adsorption force and a high responsiveness of the electrostatic chuck. However, in general, the volume resistivity of aluminum nitride decreases to $10^7$ $\Omega \cdot cm$ or less at high temperature of 300° C. or more. Therefore, aluminum nitride cannot be used as a material for the substrate of an electrostatic chuck at high temperatures. In view of these circumstances, as disclosed in Japanese Patent Application Laid-open Nos. H9-315867 and 2003-55052, attempts have been made to improve the volume resistivity of aluminum nitride at high temperatures.

However, because the volume resistivity of conventional aluminum nitride has a high dependency upon temperature, when the conventional aluminum nitride is used as a substrate material for an electrostatic chuck, the workable temperature range for the electrostatic chuck is limited.

The present invention has been achieved in order to solve the above problem, and an object of the invention is to provide an aluminum nitride sintered body that exhibits suitable volume resistivity when it is used in a substrate material for an electrostatic chuck at high temperatures, and low in temperature dependency of the volume resistivity, and a method of manufacturing the aluminum nitride sintered body.

SUMMARY OF THE INVENTION

A feature of the aluminum nitride sintered body according to the present invention resides in that a conductive channel made of $(Sm, Ce)Al_{11}O_{18}$ is interconnected in the grain boundaries of aluminum nitride particles; at the same time, an aluminum nitride particle forms a solid solution with at least one of C and Mg.

A feature of a method of manufacturing an aluminum nitride sintered body according to a first aspect of the present invention resides in that the method comprises a step of blending at least either one of a $B_4C$ powder and a MgO powder, $(Sm, Ce)Al_{11}O_{18}$ powder with an aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body.

A feature of a method of manufacturing an aluminum nitride sintered body according to a second aspect of the present invention resides in that the method comprises a step of raising the temperature of an aluminum nitride powder together with a metal oxide powder to a temperature of 2000° C. or more in a carbon-reducing atmosphere, thereby heat treating the aluminum nitride powder; a step of blending at least a $(Sm, Ce)Al_{11}O_{18}$ powder with the heat treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body.

A feature of a method of manufacturing an aluminum nitride sintered body according to a third aspect of the present invention resides in that the method comprises a step of raising the temperature of an aluminum nitride powder together with a metal oxide powder to a temperature of 2000° C. or more in a carbon-reducing atmosphere, thereby heat-treating the aluminum nitride powder; a step of blending at least a non-heat-treated aluminum nitride powder, a MgO powder and a $(Sm, Ce)Al_{11}O_{18}$ powder with the heat-treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body.

A feature of a method of manufacturing an aluminum nitride sintered body according to a fourth aspect of the present invention resides in that the method comprises a step of raising the temperature of an aluminum nitride powder together with a metal oxide powder to a temperature of 2000° C. or more in a carbon-reducing atmosphere, thereby heat-treating the aluminum nitride powder; a step of blending at least a non-heat-treated aluminum nitride powder, a MgO powder, a $Sm_2O_3$ powder, a $CeO_2$ powder and an $Al_2O_3$ powder with the heat-treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body.

The molar ratio Sm/Ce (Sm content to Ce content) in the aluminum nitride sintered body desirably falls within the range of more than 0.05 to less than 0.3. The ratio of volume resistivity A at 100° C. to volume resistivity A' at 300° C., that is, log (A/A'), in the aluminum nitride sintered body desirably falls within the range of more than 1.5 to less than 2.2. The volume resistivity of the aluminum nitride sintered body at 300° C. desirably falls within the range of more than $1 \times 10^9$ $\Omega \cdot cm$ to less than $2 \times 10^{12}$ $\Omega \cdot cm$. The volume resistivity of the aluminum nitride sintered body at 500° C. desirably falls within the range of $1 \times 10^8$ $\Omega \cdot cm$ to $1 \times 10^{11}$ $\Omega \cdot cm$.

The brightness of the aluminum nitride sintered body based on JIS Z8721 is desirably N4 or less. The aluminum nitride sintered body desirably contains at least one type of transition metal element selected from the group consisting of the IVA family, VA family, VIA family, VIIA family and VIIIA family of the periodical table within the range of more than 0.01 wt % to less than 1.0 wt %.

According to the aluminum nitride powder and the method of manufacturing the same, it is possible to provide an aluminum nitride sintered body that exhibits suitable volume resistivity when it is used in a substrate material for an electrostatic chuck in a high temperature atmosphere of 300° C. or more, and which has a volume resistivity with a low temperature dependency.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION OF THE INVENTION

Figure 1:
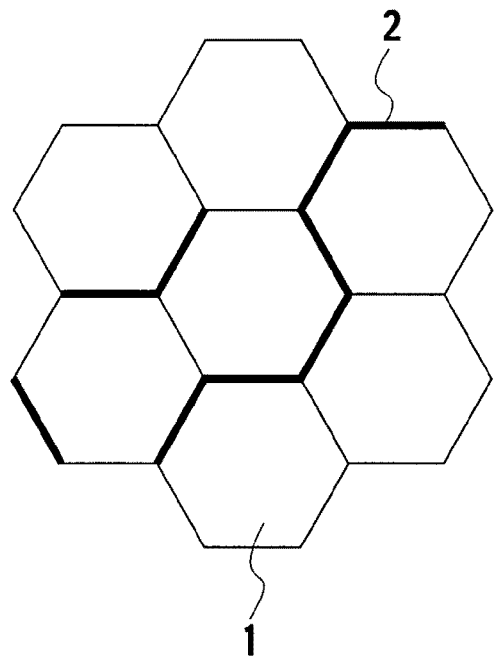
FIG. 1 is a schematic diagram showing a structure of an aluminum nitride sintered body according to the present invention.

As a result of intensive researches conducted by the present inventors, they have found that, as shown in FIG. 1, an aluminum nitride sintered body that exhibits a suitable volume resistivity when it is used in an electrostatic chuck at a temperature of 300° C. or more, and which has a volume resistivity with a low temperature dependency can be obtained by: (1) interconnecting a $(Sm, Ce)Al_{11}O_{18}$ phase, which has volume resistivity low in temperature dependency, in the grain boundaries of aluminum nitride (AlN) particles 1 to form a conductive channel 2, thereby reducing temperature dependency of the volume resistivity of an aluminum nitride sintered body; and (2) forming a solid solution of the AlN particles 1 with at least one of C (carbon) and Mg (magnesium) to maintain the volume resistivity of the AlN particles 1 at a high value even at high temperatures, thereby preventing the conductive channel from moving into the AlN particles 1.

The present invention will be explained below based on Examples.

EXAMPLE 1

In Example 1, first, a commercially available AlN powder (oxygen content: 0.9 wt %, average particle diameter: about 1 μm) manufactured by a reductive nitriding process, a commercially available MgO powder (purity: 99% or more, average particle diameter: about 1 μm) and a $(Sm, Ce)Al_{11}O_{18}$ powder were weighed so as to satisfy a weight ratio of 34.1: 1.7:64.2 (wt %). After that, they were subjected to wet blending using an IPA (isopropyl alcohol) as a solvent, nylon balls and nylon pot for 4 hours.

The process for manufacturing the AlN powder is not limited to a reductive nitriding process, and a vapor phase synthetic method, a direct nitriding process and other processes can be employed. Furthermore, the $(Sm, Ce)Al_{11}O_{18}$ powder was prepared by: (1) blending $Sm_2O_3$, $CeO_2$ and $Al_2O_3$ (each had a purity of 99% or more, an average particle diameter of about 1 μm) using an IPA as a solvent, nylon balls and nylon pot so as to satisfy a molar ratio of Sm:Ce:Al of 0.1:0.9:11; (2) drying the powder mixture and subjecting it to uniaxial pressing at a pressure of 200 kgf/cm² to form a disk-shaped product having a diameter (φ) of about 50 mm and a thickness of about 20 mm; (3) applying heat treatment to the disk-shaped product in a nitrogen atmosphere at 1600° C. for 12 hours; and (4) pulverizing the resultant sintered body by a ball mill using alumina balls, followed by a jet mill until particles having an average diameter of 1 μm or less were obtained.

The powder mixture was then dried at 110° C. and subjected to uniaxial pressing at a pressure of 200 kgf/cm² to form a disk-shaped product having a diameter (φ) of about 50 mm and a thickness of about 20 mm. Finally, the disk-shaped product was housed in a graphite die for sintering and a sintering process was performed at a press pressure of 200 kgf/cm² and a sintering temperature of 1800° C. to produce an aluminum nitride sintered body according to Example 1. The sintering process was carried out in a vacuum from room temperature to 1000° C., and in a nitrogen atmosphere of 0.15 MPa from 1000° C. to the sintering temperature.

EXAMPLE 2

In Example 2, an aluminum nitride sintered body according to Example 2 was produced by performing the same process as in Example 1, except that the AlN powder, the MgO powder and the $(Sm, Ce)A_{11}O_{18}$ powder were weighed so as to satisfy a weight ratio of 53.0:2.6:44.4 (wt %).

EXAMPLE 3

In Example 3, an aluminum nitride sintered body according to Example 3 was produced by performing the same process as in Example 2, except that the sintering temperature was set at 1700° C.

EXAMPLE 4

In Example 4, an aluminum nitride sintered body according to Example 4 was produced by performing the same process as in Example 1, except that the AlN powder, the MgO powder and the $(Sm, Ce)Al_{11}O_{18}$ powder were weighed so as to satisfy a weight ratio of 53.5:1.6:44.9 (wt %).

EXAMPLE 5

In Example 5, an aluminum nitride sintered body according to Example 5 was produced by performing the same process as in Example 1, except that the AlN powder, the MgO powder and the $(Sm, Ce)Al_{11}O_{18}$ powder were weighed so as to satisfy a weight ratio of 52.4:3.7:43.9 (wt %).

EXAMPLE 6

In Example 6, an aluminum nitride sintered body according to Example 6 was produced by performing the same process as in Example 2, except that the pressure of the nitrogen atmosphere was set at 0.9 MPa.

EXAMPLE 7

In Example 7, an aluminum nitride sintered body according to Example 7 was produced by first weighing an AlN powder, a commercially available $B_4C$ powder (purity: 98% or more, average particle diameter: about 1.5 μm) and a $(Sm, Ce)Al_{11}O_{18}$ powder so as to satisfy a weight ratio of 53.8:1.1:

45.1 (wt %), and blending these powders using an IPA as a solvent, nylon balls and nylon pot for 4 hours, followed by performing the same process as in Example 1.

EXAMPLE 8

In Example 8, an aluminum nitride sintered body according to Example 8 was produced by performing the same process as in Example 1, except that the AlN powder, the MgO powder and the (Sm, Ce)$Al_{11}O_{18}$ powder were weighed so as to satisfy a weight ratio of 53.2:2.1:44.6 (wt %).

EXAMPLE 9

Figure 2:
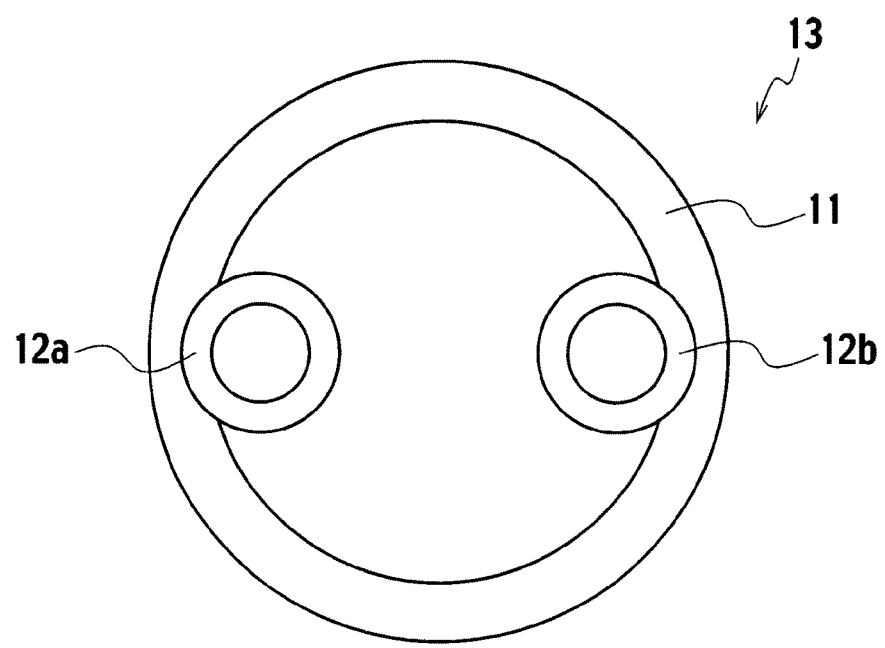
FIG. 2 is a schematic diagram showing a structure of a crucible used in a heat treatment of an aluminum nitride sintered body.

In Example 9, first, 80 g of an AlN powder and 4.0 g of an aluminum oxide powder ($Al_2O_3$) were placed in a graphite crucible 11 and a graphite crucible 12a, 12b (shown in FIG. 2) respectively. The entire crucible 13 shown in FIG. 2 was then subjected to heat treatment in which the crucible was maintained in a nitrogen atmosphere containing carbon monoxide having a temperature of 2200° C. and a pressure of 1.5 kgs/$cm^2$ for 2 hours. Thereafter, the resultant powder after heat-treatment was pulverized by a ball mill using alumina balls to until particles having an average diameter of 10 to 20 μm were obtained. In this manner, a heat-treated AlN powder was produced.

Next, the heat-treated AlN powder and a (Sm, Ce)$Al_{11}O_{18}$ powder were weighed so as to satisfy a weight ratio of 76.1:23.9 (wt %). They were then placed in a flask together with camphene and alumina balls and set in a water bath of 75° C. After the camphene was melted and the materials in the flask were formed into slurry, a propeller was rotated to stir the slurry. After the stirring, the water bath was replaced with a container containing iced water and the slurry was cooled with stirring in the same manner. When the camphene was solidified and the rotation of the propeller was decreased, the rotation thereof was stopped. The substance in the flask was transferred to a tray and allowed to be still for 2 days to sublime the camphene. Since blended powder and alumina balls were left in the tray, the powders and the balls were separated by a sieve. The powder mixture was then subjected to uniaxial pressing at a pressure of 200 kgf/$cm^2$ to form a disk-shaped product having a diameter (ϕ) of about 50 mm and a thickness of about 20 mm. Finally, the disk-shaped product was housed in a graphite die or sintering and a sintering process was performed at a press pressure of 200 kgf/$cm^2$ and a sintering temperature of 1900° C. to obtain an aluminum nitride sintered body according to Example 9. The sintering process was carried out in a vacuum from room temperature to 1000° C., and in a nitrogen atmosphere of 0.15 MPa from 1000° C. to the sintering temperature.

EXAMPLE 10

In Example 10, first, an AlN powder, a MgO powder, a heat-treated AlN powder and an (Sm, Ce)$Al_{11}O_{18}$ powder were weighed so as to satisfy a weight ratio of 14.2:0.7:73.1:11.9 (wt %). They were then blended in the same manner as in Example 9.

Next, the powder mixture was subjected to uniaxial pressing at a pressure of 200 kgf/$cm^2$ to form a disk-shaped product having a diameter of about ϕ 50 mm and a thickness of about 20 mm. Finally, the disk-shaped product was housed in a graphite die for sintering and a sintering process was performed at a press pressure of 200 kgf/$cm^2$ and a sintering temperature of 1900° C. to obtain an aluminum nitride sintered body according to Example 10. The sintering process was carried out in a vacuum from room temperature to 1000° C., and in a nitrogen atmosphere of 0.15 MPa from 1000° C. to the sintering temperature.

EXAMPLE 11

In Example 11, an aluminum nitride sintered body according to Example 11 was produced by performing the same process as in Example 10, except that the AlN powder, the MgO powder, the heat-treated AlN powder and the (Sm, Ce)$Al_{11}O_{18}$ powder were weighed so as to satisfy a weight ratio of 8.6:0.4:83.7:7.2 (wt %).

EXAMPLE 12

In Example 12, first an AlN powder, a MgO powder, a heat-treated AlN powder, a (Sm, Ce)$Al_{11}O_{18}$ powder and a titanium nitride (TiN) powder were weighed so as to satisfy a weight ratio of 14.2:0.7:72.9:11.9:0.3 (wt %). These powders were then blended in the same manner as in Example 9.

Next, the powder mixture was subjected to uniaxial pressing at a pressure of 200 kgf/$cm^2$ to form a disk-shaped product having a diameter of about ϕ 50 mm and a thickness of about 20 mm. Finally, the disk-shaped product was housed in a graphite die for sintering and a sintering process was performed at a press pressure of 200 kgf/$cm^2$ and a sintering temperature of 1875° C. to obtain an aluminum nitride sintered body according to Example 12. The sintering process was carried out in a vacuum from room temperature to 1000° C., and in a nitrogen atmosphere of 0.15 MPa from 1000° C. to the sintering temperature.

EXAMPLE 13

In Example 13, an aluminum nitride sintered body according to Example 13 was produced by performing the same process as in Example 12, except that the (Sm, Ce)$Al_{11}O_{18}$ powder was produced by blending $Sm_2O_3$, $CeO_2$ and $Al_2O_3$ in a IPA as a solvent so as to satisfy a molar ratio of Sm:Ce:Al of 0.15:0.85:11.

EXAMPLE 14

In Example 14, first an AlN powder, a MgO powder, a heat-treated AlN powder, a (Sm, Ce)$Al_{11}O_{18}$ powder and a TiN powder were weighed so as to satisfy a weight ratio of 8.6:0.4:83.4:7.2:0.3 (wt %). These powders were then blended in the same manner as in Example 9.

Next, the powder mixture was subjected to uniaxial pressing at a pressure of 200 kgf/$cm^2$ to form a disk-shaped product having a diameter (ϕ) of about 50 mm and a thickness of about 20 mm. Finally, the disk-shaped product was housed in a graphite die for sintering and a sintering process was performed at a press pressure of 200 kgf/$cm^2$ and a sintering temperature of 1900° C. to obtain an aluminum nitride sintered body according to Example 14. The sintering process was carried out in a vacuum from room temperature to 1000° C., and in a nitrogen atmosphere of 0.15 MPa from 1000° C. to the sintering temperature.

EXAMPLE 15

In Example 15, an aluminum nitride sintered body according to Example 15 was produced by performing the same process as in Example 14, except that the (Sm, Ce)$A_{11}O_{18}$ powder was produced by blending $Sm_2O_3$, $CeO_2$ and $Al_2O_3$ in a IPA as a solvent so as to satisfy a molar ratio of Sm:Ce:Al of 0.2:0.8:11.

EXAMPLE 16

In Example 16, an aluminum nitride sintered body according to Example 16 was produced by performing the same process as in Example 9, except that the $(Sm, Ce)Al_{11}O_{18}$ powder was produced by blending $Sm_2O_3$, $CeO_2$ and $Al_2O_3$ in a IPA as a solvent so as to satisfy a molar ratio of Sm:Ce:Al of 0.15:0.85:11.

EXAMPLE 17

In Example 17, an aluminum nitride sintered body according to Example 17 was produced by performing the same process as in Example 9, except that the $(Sm, Ce)Al_{11}O_8$ powder was produced by blending $Sm_2O_3$, $CeO_2$ and $Al_2O_3$ in a IPA as a solvent so as to satisfy a molar ratio of Sm:Ce:Al of 0.2:0.8:11.

EXAMPLE 18

In Example 18, an AlN powder treated with heat, $Sm_2O_3$, $CeO_2$ and $Al_2O_3$ were weighed so as to satisfy a weight ratio of 76.1:0.6:5.1:18.3 (wt %). These powders were then blended in the same manner as in Example 9.

Next, the powder mixture was subjected to uniaxial pressing at a pressure of 200 kgf/cm² to form a disk-shaped product having a diameter (ϕ) of about 50 mm and a thickness of about 20 mm. Finally, the disk-shaped product was housed in a graphite die for sintering and a sintering process was performed at a press pressure of 200 kgf/cm² and a sintering temperature of 1900° C. to obtain an aluminum nitride sintered body according to Example 18. The sintering process was carried out in a vacuum from room temperature to 1000° C., and in a nitrogen atmosphere of 0.15 MPa from 1000° C. to the sintering temperature.

COMPARATIVE EXAMPLE 1

In Comparative Example 1, first, an AlN powder was subjected to uniaxial pressing at a pressure of 200 kgf/cm² to form a disk-shaped product having a diameter (ϕ) of about 50 mm and a thickness of about 20 mm. Next, the disk-shaped product was housed in a graphite die for sintering and a sintering process was performed at a press pressure of 200 kgf/cm² and a sintering temperature of 1900° C. to obtain an aluminum nitride sintered body according to Comparative Example 1. The sintering process was carried out in a vacuum from room temperature to 1000° C., and in a nitrogen atmosphere of 0.15 MPa from 1000° C. to the sintering temperature.

COMPARATIVE EXAMPLE 2

In Comparative Example 2, first, an AlN powder and a MgO powder were weighed so as to satisfy a weight ratio of 99.0:1.0 (wt %). These powders were blended using an IPA as a solvent, nylon balls and nylon pot for 4 hours. Next, the powder mixture was dried at 110° C. and subjected to uniaxial pressing at a pressure of 200 kgf/cm² to form a disk-shaped product having a diameter (ϕ) of about 50 mm and a thickness of about 20 mm. Finally, the disk-shaped product was housed in a graphite die for sintering and a sintering process was performed at a press pressure of 200 kgf/cm² and a sintering temperature of 1900° C. to produce the aluminum nitride sintered body according to Comparative Example 2. The sintering process was carried out in a vacuum from room temperature to 1000° C., and in a nitrogen atmosphere of 0.15 MPa from 1000° C. to the sintering temperature.

COMPARATIVE EXAMPLE 3

In Comparative Example 3, first, an AlN powder and a $B_4C$ powder were weighed so as to satisfy a weight ratio of 96.7:3.3 (wt %). These powders were blended using an IPA as a solvent, nylon balls and nylon pot for 4 hours. Next, the powder mixture was dried at 110° C. and subjected to uniaxial pressing at a pressure of 200 kgf/cm² to form a disk-shaped product having a diameter (ϕ) of about 50 mm and a thickness of about 20 mm. Finally, the disk-shaped product was housed in a graphite die for sintering and a sintering process was performed at a press pressure of 200 kgf/cm² and a sintering temperature of 2000° C. to produce the aluminum nitride sintered body according to Comparative Example 3. The sintering process was carried out in a vacuum from room temperature to 1000° C., and in a nitrogen atmosphere of 0.15 MPa from 1000° C. to the sintering temperature.

COMPARATIVE EXAMPLE 4

In Comparative Example 4, first, the AlN powder heat-treated in the same step as in Example 9 was subjected to uniaxial pressing at a pressure of 200 kgf/cm² to form a disk-shaped product having a diameter (ϕ) of about 50 mm and a thickness of about 20 mm. The disk-shaped product was housed in a graphite die for sintering and a sintering process was performed at a press pressure of 200 kgf/cm² and a sintering temperature of 2000° C. to produce the aluminum nitride sintered body according to Comparative Example 4. The sintering process was carried out in a vacuum from room temperature to 1000° C., and in a nitrogen atmosphere of 0.15 MPa from 1000° C. to the sintering temperature.

COMPARATIVE EXAMPLE 5

In Comparative Example 5, first, an AlN powder, a $Sm_2O_3$ powder and a $CeO_2$ powder were weighed so as to satisfy a weight ratio of 98.0:1.0:1.0 (wt %). These powders were then blended using an IPA as a solvent, nylon balls and nylon pot for 4 hours. Next, the powder mixture was dried at 110° C. and subjected to uniaxial pressing at a pressure of 200 kgf/cm² to form a disk-shaped product having a diameter (ϕ) of about 50 mm and a thickness of about 20 mm. Finally, the disk-shaped product was housed in a graphite die for sintering and a sintering process was performed at a press pressure of 200 kgf/cm² and a sintering temperature of 1800° C. to produce the aluminum nitride sintered body according to Comparative Example 5. The sintering process was carried out in a vacuum from room temperature to 1000° C., and in a nitrogen atmosphere of 0.15 MPa from 1000° C. to the sintering temperature.

COMPARATIVE EXAMPLE 6

In Comparative Example 6, an aluminum nitride sintered body according to Comparative Example 6 was produced by performing the same process as in Example 12, except that the sintering temperature was set at 1850° C.

COMPARATIVE EXAMPLE 7

In Comparative Example 7, an aluminum nitride sintered body according to Comparative Example 7 was produced by performing the same process as in Example 5, except that the AlN powder, the $Sm_2O_3$ powder and the $CeO_2$ powder were weighed so as to satisfy a weight ratio of 98.96:0.99:0.05 (wt %).

Aluminum nitride sintered bodies obtained by the processes in Examples and Comparative Examples above were evaluated, and the results are shown in Tables 1 and 2.

[Evaluation Method]

Aluminum nitride sintered bodies of Examples and Comparative Examples were individually measured for the content of a metal component (wt %), carbon amount (wt %), volume resistivity ($\Omega \cdot cm$) at 100, 300 and 500° C., variation of volume resistivity along with temperature increase from 100° C. to 300° C., thermal conductivity (W/mK) and an Sm/Ce molar ratio. In addition, the presence or absence of an $(Sm, Ce)Al_{11}O_{18}$ phase in aluminum nitride sintered bodies of Examples and Comparative Examples was checked. Each value was determined according to the following methods.

(1) The Content of Metal Component

The content of a metal component was quantified by an ICP emission spectrometric analysis.

(2) Carbon Amount

Carbon amount was quantified by high-frequency heating infrared absorption method.

(3) Volume Resistivity

Volume resistivity was measured according to JIS C2141 in a vacuum at 100, 300 and 500° C. To explain more specifically, test pieces of $\phi$ 50 mm×1 mm were prepared. A main electrode having a diameter of 20 mm, a guard electrode having an inner diameter of 30 mm and an outer diameter of 40 mm, and an applying electrode having a diameter of 45 mm each were formed of silver. A voltage of 500 V/mm was applied. One minute after applying the voltage, a current was measured to calculate the volume resistivity.

(4) Variation of Volume Resistivity

Variation of volume resistivity was calculated by substituting a value of volume resistivity A at 100° C. and a value of volume resistivity A' at 300° C. into the formula of: Log (volume resistivity A at 100° C./Volume resistivity A' at 300° C.).

(5) Thermal Conductivity

Thermal conductivity was measured by a laser flash method.

(6) Sm/Ce Ratio

Sm/Ce ratio was calculated by substituting an Sm content (wt %) and a Ce content (wt %) into the formula of: Log (Sm content (wt %)/150.36/Ce content (wt %)/140.12).

(7) Presence or Absence of $(Sm, Ce)Al_{11}O_{18}$ Phase

The presence or absence of a $(Sm, Ce)Al_{11}O_{18}$ phase was determined based on whether an $(Sm, Ce)Al_{11}O_{18}$ phase was detected by a rotating-anode-type X-ray diffractometer (RINT by Rigaku Corporation). Note that there was no JCPDS card of $(Sm, Ce)Al_{11}O_{18}$. Instead, the peak of a $CeAl_{11}O_{18}$ was checked to confirm the presence or absence of an $(Sm, Ce)Al_{11}O_{18}$ phase. The measurement was performed in the conditions of X-ray source: CuK$\alpha$ beam, 50 kV, 300 mA, and a monochro-angle $2\theta$: 10 to 70°.

TABLE 1

| | Raw material composition | | | | | | | | | Sintering conditions | | Volume resistivity | | | |
|---|---|---|---|---|---|---|---|---|---|---|---|---|---|---|---|
| | AlN wt % | MgO wt % | B4C wt % | Heat treated AlN wt % | $(Sm_1Ce)Al_{11}O_{18}$ wt % | TiN wt % | SM2O3 wt % | CeO2 wt % | Al2O3 wt % | Sintering temperature ° C. | N$_2$ pressure MPa | @ 100° C. $\Omega$cm | @ 300° C. $\Omega$cm | @ 500° C. $\Omega$cm | 100-300° C. resistivity change |
| Example 1 | 34.1 | 1.7 | — | — | 64.2 | — | — | — | — | 1800 | 0.15 | 6.1E+11 | 5.5E+09 | 5.6E+08 | 2.0 |
| Example 2 | 53.0 | 2.6 | — | — | 44.4 | — | — | — | — | 1800 | 0.15 | 2.0E+13 | 2.1E+11 | 2.7E+09 | 2.0 |
| Example 3 | 53.0 | 2.6 | — | — | 44.4 | — | — | — | — | 1700 | 0.15 | 2.0E+13 | 1.5E+11 | 1.2E+09 | 2.1 |
| Example 4 | 53.5 | 1.6 | — | — | 44.9 | — | — | — | — | 1800 | 0.15 | 4.0E+13 | 3.3E+11 | 2.6E+09 | 2.1 |
| Example 5 | 52.4 | 3.7 | — | — | 43.9 | — | — | — | — | 1800 | 0.15 | 5.0E+13 | 1.2E+12 | 2.1E+09 | 1.6 |
| Example 6 | 53.0 | 2.6 | — | — | 44.4 | — | — | — | — | 1800 | 0.9 | 2.3E+13 | 3.2E+11 | 2.7E+09 | 1.9 |
| Example 7 | 53.8 | — | 1.1 | — | 45.1 | — | — | — | — | 1800 | 0.15 | 1.7E+13 | 1.3E+11 | 6.7E+08 | 2.1 |
| Example 8 | 53.2 | — | 2.1 | — | 44.6 | — | — | — | — | 1800 | 0.15 | 2.2E+13 | 2.0E+11 | 1.7E+09 | 2.0 |
| Example 9 | — | — | — | 76.1 | 23.9 | — | — | — | — | 1900 | 0.15 | 7.0E+13 | 8.2E+11 | 4.2E+09 | 1.9 |
| Example 10 | 14.2 | 0.7 | — | 73.1 | 11.9 | — | — | — | — | 1900 | 0.15 | 3.0E+13 | 3.8E+11 | 5.0E+09 | 1.9 |
| Example 11 | 8.6 | 0.4 | — | 83.7 | 7.2 | — | — | — | — | 1900 | 0.15 | 5.8E+13 | 8.8E+11 | 3.8E+09 | 1.8 |
| Example 12 | 14.2 | 0.7 | — | 72.9 | 11.9 | 0.3 | — | — | — | 1875 | 0.15 | 6.0E+13 | 7.5E+11 | 2.5E+09 | 1.9 |
| Example 13 | 14.2 | 0.7 | — | 72.9 | 11.9 | 0.3 | — | — | — | 1875 | 0.15 | 1.5E+12 | 1.2E+10 | 1.1E+09 | 2.1 |
| Example 14 | 8.6 | 0.4 | — | 83.4 | 7.2 | 0.3 | — | — | — | 1900 | 0.15 | 8.7E+12 | 1.4E+11 | 7.4E+08 | 1.8 |
| Example 15 | 8.6 | 0.4 | — | 83.4 | 7.2 | 0.3 | — | — | — | 1900 | 0.15 | 1.3E+12 | 2.0E+10 | 3.0E+08 | 1.8 |

TABLE 1-continued

| | | | | | | | | | | | | | |
|---|---|---|---|---|---|---|---|---|---|---|---|---|---|
| Example 16 | — | — | — | 76.1 | 23.9 | — | — | — | 1900 | 0.15 | 7.0E+11 | 1.0E+10 | 2.8E+08 | 1.8 |
| Example 17 | — | — | — | 76.1 | 23.9 | — | — | — | 1900 | 0.15 | 4.2E+11 | 5.0E+09 | 2.2E+08 | 1.9 |
| Example 18 | — | — | — | 76.1 | — | — | 0.6 | 5.1 | 18.3 | 1900 | 0.15 | 5.1E+12 | 5.0E+10 | 7.8E+08 | 2.0 |

| | AlN sintered body characteristics | | | | | | | |
|---|---|---|---|---|---|---|---|---|
| | Chemical analysis | | | | | | | |
| | Sm wt % | Ce wt % | C wt % | Mg wt % | Sm/Ce molar ratio | $(Sm_3Ce)Al_{11}O_{18}$ (Conversion amount) wt % | XRD Presence/absence of $(Sm, Ce)Al_{11}O_{18}$ | Thermal conductivity W/mK |
| Example 1 | 1.30 | 11.31 | 0.03 | 1.05 | 0.11 | 64.87 | Present | 15 |
| Example 2 | 0.52 | 4.66 | 0.03 | 1.69 | 0.10 | 26.65 | Present | 31 |
| Example 3 | 0.54 | 4.84 | 0.03 | 1.76 | 0.10 | 27.68 | Present | 30 |
| Example 4 | 0.55 | 4.96 | 0.03 | 1.04 | 0.10 | 28.35 | Present | 33 |
| Example 5 | 0.53 | 4.79 | 0.02 | 2.33 | 0.10 | 27.37 | Present | 25 |
| Example 6 | 0.54 | 4.82 | 0.02 | 1.80 | 0.10 | 27.58 | Present | 31 |
| Example 7 | 0.55 | 4.96 | 0.22 | 0.06 | 0.10 | 28.35 | Present | 19 |
| Example 8 | 0.54 | 4.86 | 0.61 | 0.06 | 0.10 | 27.79 | Present | 14 |
| Example 9 | 0.21 | 2.14 | 0.22 | 0.04 | 0.09 | 12.10 | Present | 48 |
| Example 10 | 0.09 | 0.91 | 0.18 | 0.43 | 0.10 | 5.17 | Present | 56 |
| Example 11 | 0.06 | 0.67 | 0.22 | 0.24 | 0.09 | 3.78 | Present | 73 |
| Example 12 | 0.18 | 0.94 | 0.19 | 0.45 | 0.18 | 5.74 | Present | — |
| Example 13 | 0.23 | 0.83 | 0.19 | 0.45 | 0.26 | 5.42 | Present | — |
| Example 14 | 0.10 | 0.58 | 0.16 | 0.26 | 0.16 | 3.49 | Present | — |
| Example 15 | 0.12 | 0.48 | 0.16 | 0.25 | 0.23 | 3.07 | Present | — |
| Example 16 | 0.53 | 3.09 | 0.17 | 0.02 | 0.16 | 18.58 | Present | 56 |
| Example 17 | 0.68 | 2.84 | 0.16 | 0.02 | 0.22 | 18.02 | Present | 52 |
| Example 18 | 0.37 | 1.49 | 0.21 | 0.02 | 0.23 | 9.52 | Present | 57 |

TABLE 2

| | Raw material composition | | | | | | | | | Sintering conditions | | Volume resistivity | | | 100-300° C. resistivity change |
|---|---|---|---|---|---|---|---|---|---|---|---|---|---|---|---|---|
| | AlN wt % | MgO wt % | B4C wt % | Heat treated AlN wt % | $(Sm_1Ce)Al_{11}O_{18}$ wt % | TiN wt % | SM2O3 wt % | CeO2 wt % | Al2O3 wt % | Sintering temperature ° C. | $N_2$ pressure MPa | @ 100° C. Ωcm | @ 300° C. Ωcm | @ 500° C. Ωcm | |
| Comparative Example 1 | 100.0 | — | — | — | | — | | | — | 1900 | 0.15 | 6.3E+10 | 2.0E+07 | 2.0E+05 | 3.5 |
| Comparative Example 2 | 99.0 | 1.0 | — | — | | — | | | — | 1900 | 0.15 | 1.0E+15 | 8.0E+14 | 4.0E+13 | 0.1 |

TABLE 2-continued

| | | | | | | | | | | | | | |
|---|---|---|---|---|---|---|---|---|---|---|---|---|---|
| Comparative Example 3 | 96.7 | — | 3.3 | — | | — | — | 2000 | 0.15 | 8.0E+15 | 1.0E+13 | 2.3E+10 | 2.9 |
| Comparative Example 4 | — | — | — | 100.0 | | — | — | 2000 | 0.15 | 2.0E+15 | 1.0E+13 | 1.0E+11 | 2.7 |
| Comparative Example 5 | 98.0 | — | — | — | 1.0 | 1.0 | | 1800 | 0.15 | 2.0E+13 | 4.0E+10 | 3.0E+07 | 2.7 |
| Comparative Example 6 | 14.2 | 0.7 | — | 72.0 | 11.9 | 0.3 | — | — | — | 1850 | 0.15 | 3.0E+14 | 4.0E+13 | 8.3E+09 | 0.9 |
| Comparative Example 7 | 98.96 | — | — | — | — | 0.99 | 0.05 | — | 1800 | 0.15 | 1.1E+10 | 1.7E+08 | 4.0E+06 | 1.8 |

AlN sintered body characteristics

Chemical analysis

| | Sm wt % | Ce wt % | C wt % | Mg wt % | Sm/Ce molar ratio | $(Sm_3Ce)Al_{11}O_{18}$ (Conversion amount) wt % | XRD Presence/absence of $(Sm, Ce)Al_{11}O_{18}$ | Thermal conductivity W/mK |
|---|---|---|---|---|---|---|---|---|
| Comparative Example 1 | <0.01 | <0.01 | 0.03 | <0.01 | — | <0.1 | None | 96 |
| Comparative Example 2 | <0.01 | <0.01 | 0.04 | 0.50 | — | <0.1 | None | 61 |
| Comparative Example 3 | <0.01 | <0.01 | 0.80 | <0.01 | — | <0.1 | None | 50 |
| Comparative Example 4 | <0.01 | <0.01 | 0.45 | <0.01 | — | <0.1 | None | — |
| Comparative Example 5 | 0.82 | 0.76 | 0.03 | 0.01 | 1.01 | 7.94 | Present | 103 |
| Comparative Example 6 | 0.18 | 0.94 | 0.19 | 0.45 | 0.18 | 5.74 | Present | — |
| Comparative Example 7 | 0.63 | 0.04 | 0.03 | 0.05 | 13.98 | 3.30 | Present | 98 |

[Evaluation]

Figure 3:
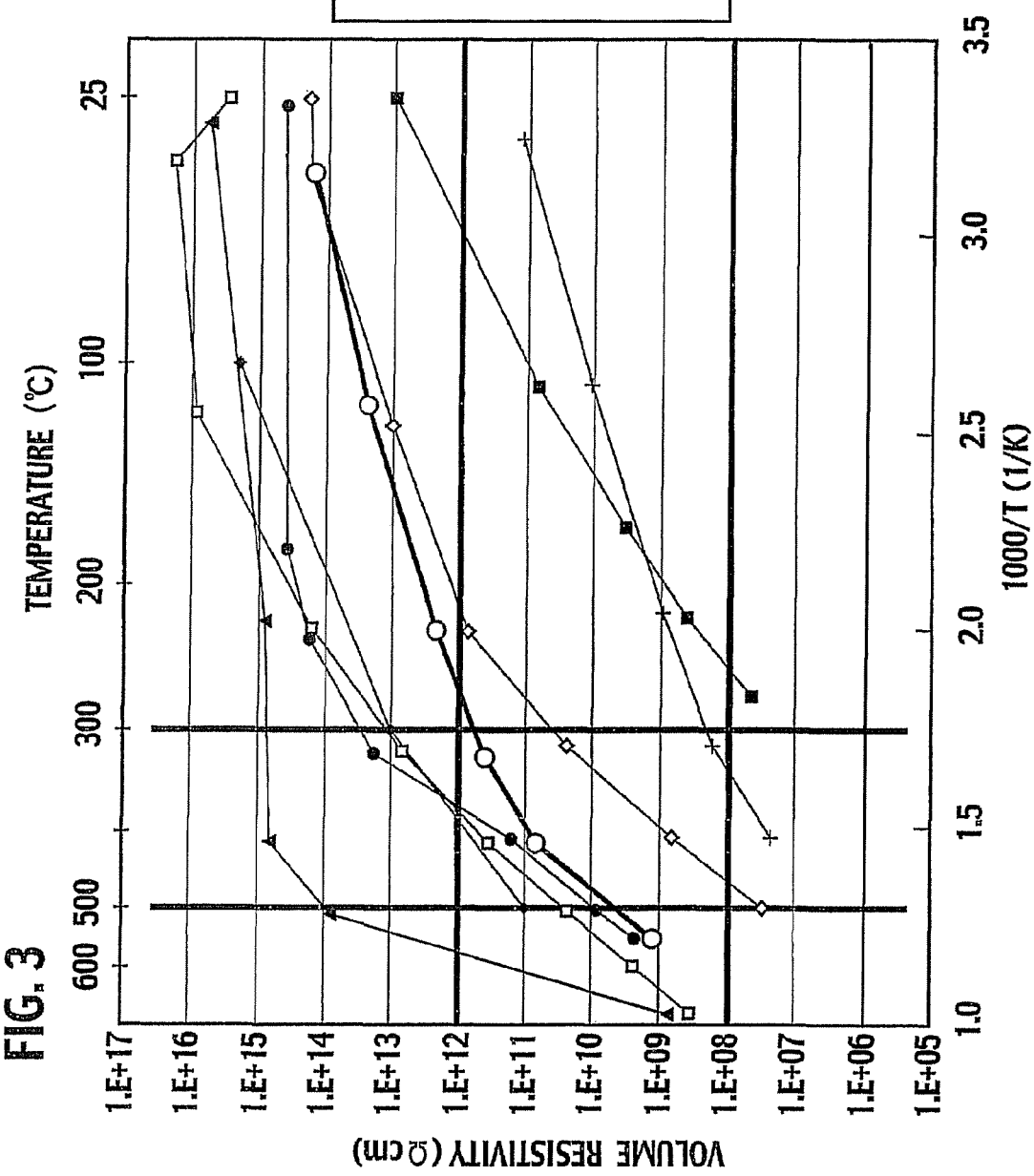
FIG. 3 is a graph showing results of a change of volume resistivity along with a change of temperature, with respect to the aluminum nitride sintered bodies according to Examples 10 and Comparative Examples 1 to 7.

Aluminum nitride sintered bodies of Examples 1 to 18 and Comparative Examples 1 to 7 were compared with respect to volume resistivity values at 300° C. and 500° C. As shown in Tables 1 and 2 and FIG. 3, the aluminum nitride sintered bodies of Examples 1 to 18 exhibited suitable volume resistivity values ($10^8$ to $10^{12}$) at both 300° C. and 500° C. for use in a substrate material for an electrostatic chuck. In contrast, in the aluminum nitride sintered bodies of Comparative Examples 1 to 7, at least one of the volume resistivity values at 300° C. and 500° C. was unsuitable for use in a substrate material for an electrostatic chuck. Furthermore, when variation in volume resistivity with a temperature increase from 100° C. to 300° C. was compared, the variations in volume resistivity of the aluminum nitride sintered bodies of Comparative Examples except for Comparative Examples 2, 6 and 7 were larger than those of Examples 1 to 18. From this, it was found that the temperature dependency of volume resistivity was high.

Figure 4:
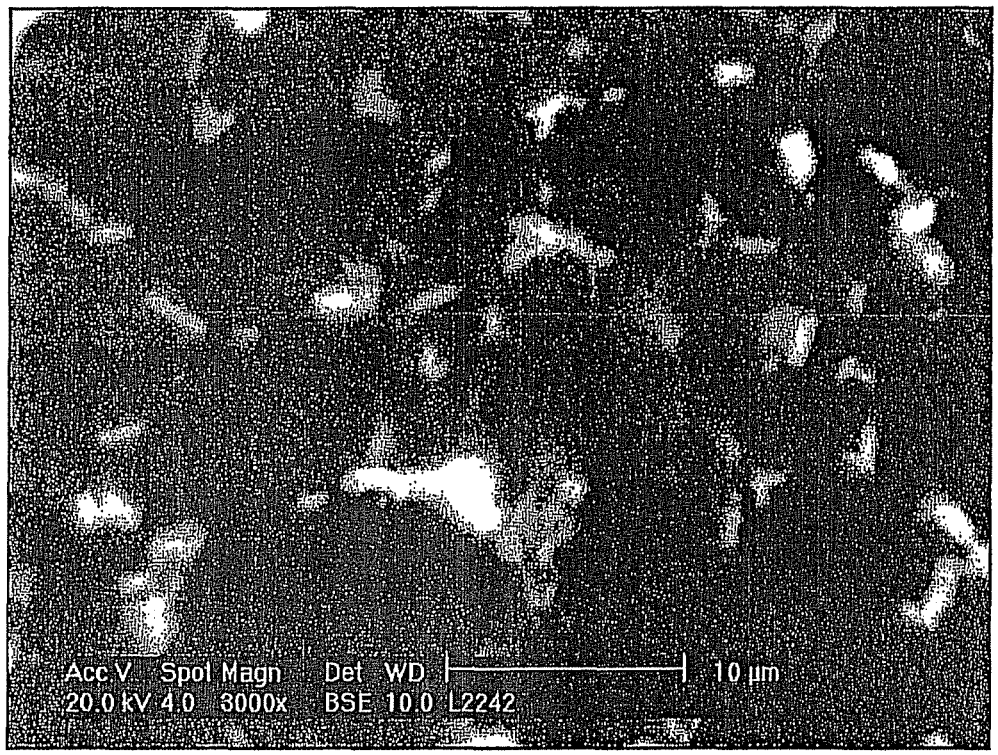
FIG. 4 is a SEM photograph of the surface of the aluminum nitride sintered body according to Comparative Example 6.

The aluminum nitride sintered bodies of Examples 1 to 18 and Comparative Examples 1 to 7 were then evaluated with respect to difference in composition. As a result, it was found that no $(Sm, Ce)Al_{11}O_{18}$ phase was present in the aluminum nitride Sintered bodies of Comparative Examples 1 to 4. Even in the cases where a $(Sm, Ce)Al_{11}O_{18}$ phase was present as was in the cases of Comparative Examples 5 to 7, it was found, in Comparative Example 6, that the $(Sm, Ce)Al_{11}O_{18}$ phase (white region shown in FIG. 4) was discretely present, as shown in the SEM photograph of FIG. 4 (obtained from the aluminum nitride sintered body of Comparative Example 6) since the sintering temperature was low compared to those of aluminum nitride sintered bodies of Examples 1 to 18. In Comparative Example 5, since C and Mg materials were not added, no solid solutions of an aluminum nitride particle with C and Mg were formed. Because of this, the volume resistivity thereof was lower than a suitable one for use in a substrate material for an electrostatic chuck in a high temperature atmosphere. In Comparative Example 7, since an Sm/Ce ratio was high, the volume resistivity was low even at a low temperature, that is, lower than that suitable one for use in a substrate material for an electrostatic chuck.

Figure 5:
FIG. 5 is a SEM photograph of the surface of the aluminum nitride sintered body according to Example 12.

In contrast, it was found that an $(Sm, Ce)Al_{11}O_{18}$ phase was present in the aluminum nitride sintered bodies of Examples 1 to 18 and interconnected as was shown in the SEM photograph of FIG. 5 (obtained from the aluminum nitride sintered body of Example 12) to form a conductive channel. Furthermore, when aluminum nitride sintered bodies of Examples 1 to 18 are compared to those of Comparative Examples 1 and 5, it was found that aluminum nitride particles form solid solutions with at least one of C and Mg in aluminum nitride sintered bodies of Examples 1 to 18.

From the above results, it was apparent that a conductive channel formed of an $(Sm, Ce)Al_{11}O_{18}$ phase was interconnected in the grain boundaries of aluminum nitride particles and aluminum nitride particles form with at least one of C and Mg. Based on these facts, it was found that an aluminum nitride sintered body that exhibits suitable volume resistivity for use in a substrate material for an electrostatic chuck at a high temperature, and which has a volume resistivity with a low temperature dependency, can be provided.

With respect to the above findings, the present inventors think that an $(Sm, Ce)Al_{11}O_{18}$ phase forms a conductive channel in the grain boundaries of aluminum nitride particles and contributes to reducing temperature dependency of the volume resistivity of an aluminum nitride sintered body. Furthermore, the inventors think that the solid solution of an aluminum nitride particle with at least one of C and Mg maintains the volume resistivity of the aluminum nitride particle at a high value even at a high temperature, and thereby contributes to preventing the conductive channel from moving into the aluminum nitride particle.

Figure 6:
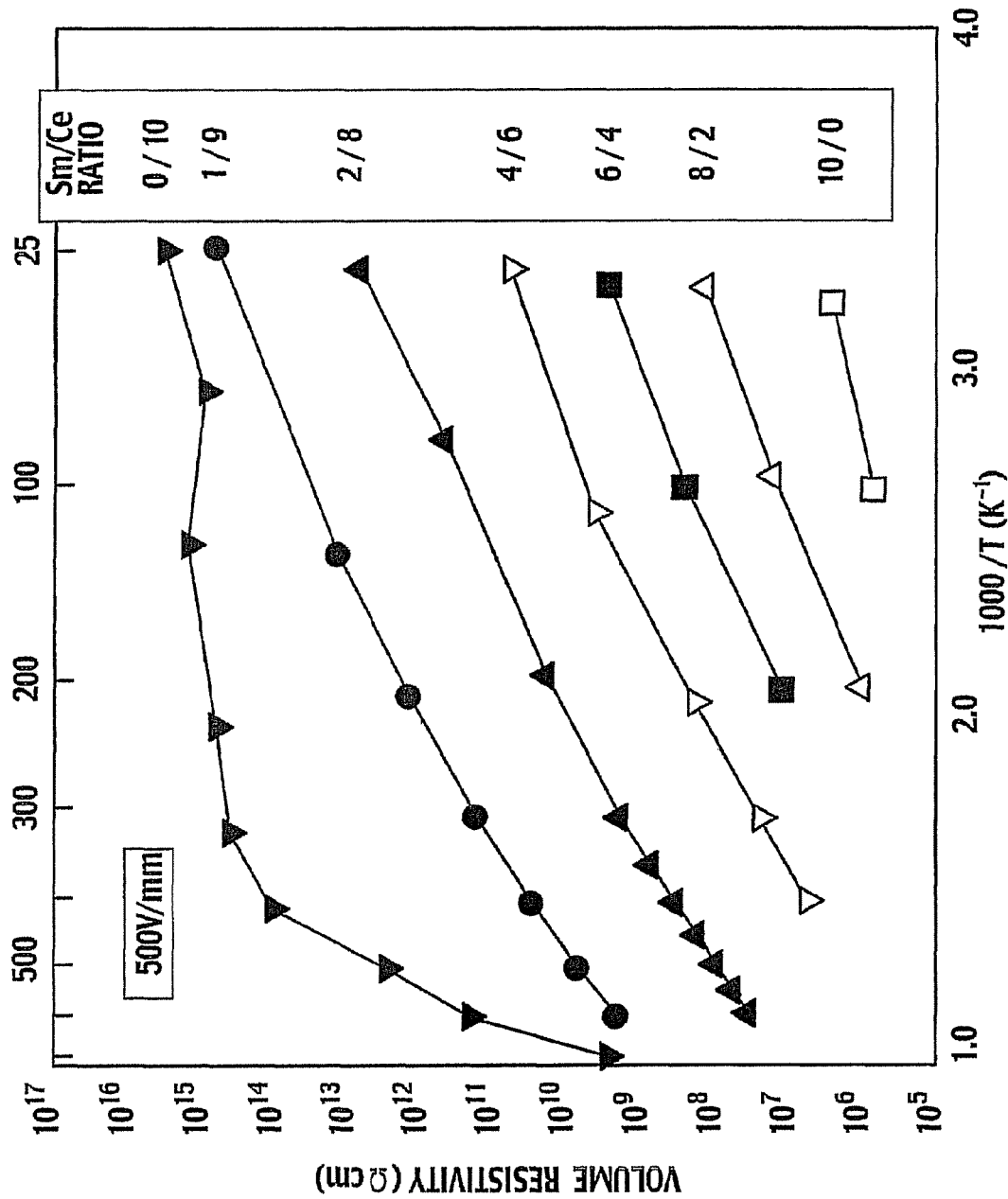
FIG. 6 is a graph showing a change of volume resistivity of a $(Sm, Ce)Al_{11}O_{18}$ phase along with a change of a Sm/Ce ratio.

The volume resistivity of an $(Sm, Ce)Al_{11}O_{18}$ phase changes depending upon the molar ratio of Sm/Ce (Sm content/Ce content), as shown in FIG. 6. When a molar ratio is 0.05 or less, the volume resistivity is too large for use in a substrate material for an electrostatic chuck. When the molar ratio is 0.3 or more, the volume resistivity is too small for use in a substrate material for an electrostatic chuck. Therefore, the molar ratio of Sm/Ce content is desirably controlled within the range of more than 0.05 to less than 0.3. As is apparent from Table 1, in the aluminum nitride sintered bodies of Examples 1 to 18, the molar ratio of Sm/Ce content falls within the above range.

As is apparent from Table 1, it was found that the aluminum nitride sintered bodies of Examples 1 to 18 has a common feature that log (A/A'), which was a ratio of volume resistivity A at 100° C. to that at 300° C., falls within the range of more than 1.5 to less than 2.2. The volume resistivity at 300° C. was found to fall within the range of more than $1 \times 10^9$ Ω·cm to less than $2 \times 10^{12}$ Ω·cm. The volume resistivity at 500° C. was found to fall within the range of more than $1 \times 10^8$ Ω·cm to less than $1 \times 10^{11}$ Ω·cm.

Although not shown in Table 1, it was found that the aluminum nitride sintered bodies of Examples 12 to 15 exhibit brightness values (according to JIS Z8721) of N4 or less. In the aluminum nitride sintered bodies of Examples 12 to 15, Ti was contained as a transition metal element. However, the transition metal element of the present invention is not limited to Ti. Any transition metal element can be used as long as it is at least one type of transition metal element selected from the group consisting of the IVA family, VA family, VIA family, VIIA family and VIIIA family of the periodical table. Furthermore, it was found that the content of the transition metal element desirably falls within the range of more than 0.01 wt % to less than 1.0 wt %.

The higher the thermal conductivity of an aluminum nitride sintered body, the more desirable. More specifically, the thermal conductivity thereof is preferably 30 W/mk or more and further preferably 50 W/mk or more. In the aluminum nitride sintered bodies of Examples, as the amount of $(Sm, Ce)Al_{11}O_{18}$ powder decreases, the thermal conductivity increases. As shown in Table 1, the aluminum nitride sintered bodies of Examples 2 to 7 exhibited higher thermal conductivity values than that of Example 1.

In the aluminum nitride sintered bodies of Examples 9 to 18, the particle diameter of an aluminum nitride powder was set at larger than that of an $(Sm, Ce)Al_{11}O_{18}$ powder in order to interconnect an $(Sm, Ce)Al_{11}O_{18}$ phase after sintering even if the amount of $(Sm, Ce)Al_{11}O_{18}$ powder was low. More specifically, the particle diameter of an aluminum nitride powder was set at 10 to 20 μm, although that of an $(Sm, Ce)Al_{11}O_{18}$ powder was 1 μm or less. This aluminum nitride powder was heat-treated. More specifically, a solid solution with C was formed, and the particle diameter was increased during the heat treatment at the same time.

The present invention is not limited to the description and the drawings which constitute a part of the disclosure of the present invention according to the embodiment. Specifically, it may be added that, needless to say, other embodiments, examples, operational technologies and the like, which are made by those skilled in the art based on the embodiment, are all included in the scope of the present invention.

What is claimed is:

1. An aluminum nitride sintered body, wherein a conductive channel formed of $(Sm, Ce)Al_{11}O_{18}$ is interconnected in grain boundaries of aluminum nitride particles and wherein aluminum nitride particles form solid solutions with at least one of C and Mg.

2. The aluminum nitride sintered body according to claim 1, wherein a molar ratio content of Sm/Ce is in a range of more than 0.05 to less than 0.3.

3. The aluminum nitride sintered body according to claim 1, wherein a ratio of volume resistivity A at 100° C. to volume resistivity A', represented by log (A/A') at 300° C., is in a range of more than 1.5 to less than 2.2.

4. The aluminum nitride sintered body according to claim 1, wherein a volume resistivity of the aluminum nitride sintered body at 300° C. is in a range of more than $1 \times 10^9$ Ω·cm to less than $2 \times 10^{12}$ Ω·cm.

5. The aluminum nitride sintered body according to claim 1, wherein a volume resistivity of the aluminum nitride sintered body at 500° C. is in a range of more than $1 \times 10^8$ Ω·cm to less than $1 \times 10^{11}$ Ω·cm.

6. The aluminum nitride sintered body according to claim 1, wherein a brightness according to JIS Z8721 is N4 or less.

7. The aluminum nitride sintered body according to claim 1, wherein at least one transition metal element selected from the group consisting of the IVA family, VA family, VIA family, VIJA family and VIIIA family of the periodical table is contained in a range of more than 0.01 wt % to less than 1.0 wt %.

8. A member for a semiconductor manufacturing device having at least one portion that is formed of the aluminum nitride sintered body according to claim 1.

9. A method of manufacturing an aluminum nitride sintered body, comprising:
   a step of blending at least either one of a $B_4C$ powder and a MgO powder, a $(Sm, Ce)Al_{11}O_{18}$ powder with an aluminum nitride powder to obtain a powder mixture and forming the powder mixture into a product; and
   a step of subjecting the formed product to hot press sintering in a nitrogen atmosphere of 1700° C. or more, thereby manufacturing the aluminum nitride sintered body having a conductive channel formed of $(Sm, Ce)Al_{11}O_{18}$ interconnected in grain boundaries of aluminum nitride particles, wherein the aluminum nitride particles form solid solutions with at least one of C and Mg.

10. A method of manufacturing an aluminum nitride sintered body, comprising:
    a step of heating an aluminum nitride powder together with a metal oxide powder to a temperature of 2000° C. or more in a carbon-reducing atmosphere, thereby heat-treating the aluminum nitride powder;

a step of blending at least a $(Sm, Ce)Al_{11}O_{18}$ powder with the heat-treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body having a conductive channel formed of $(Sm, Ce)Al_{11}O_{18}$ interconnected in grain boundaries of aluminum nitride particles, wherein the aluminum nitride particles form solid solutions with at least one of C and Mg.

11. A method of manufacturing an aluminum nitride sintered body, comprising:

a step of heating an aluminum nitride powder together with a metal oxide powder to a temperature of 2000° C. or more in a carbon-reducing atmosphere, thereby heat-treating the aluminum nitride powder;

a step of blending at least a non-heat-treated aluminum nitride powder, a MgO powder and a $(Sm, Ce)Al_{11}O_{18}$ powder with the heat-treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body having a conductive channel formed of(Sm, Ce)$Al_{11}O_{18}$ interconnected in grain boundaries of aluminum nitride particles, wherein the aluminum nitride particles form solid solutions with at least one of C and Mg.

12. A method of manufacturing an aluminum nitride sintered body, comprising:

a step heating aluminum nitride powder together with a metal oxide powder to a temperature of 2000° C. or more in a carbon-reducing atmosphere, thereby heat-treating the aluminum nitride powder;

a step of blending at least a non-heat-treated aluminum nitride powder, a MgO powder, a $Sm_2O_3$ powder, a $CeO_2$ powder and an $Al_2O_3$ powder with the heat-treated aluminum nitride powder to obtain a powder mixture and forming the powder mixture into a product; and a step of subjecting the formed product to hot press sintering in a nitrogen atmosphere of 1700° C. or more, thereby manufacturing the aluminum nitride sintered body heating a conductive channel formed of $(Sm, Ce)Al_{11}O_{18}$ interconnected in grain boundaries of aluminum nitride particles, wherein the aluminum nitride particles form solid solutions with at least one of C and Mg.

* * * * *

UNITED STATES PATENT AND TRADEMARK OFFICE
CERTIFICATE OF CORRECTION

PATENT NO. : 7,629,282 B2  Page 1 of 1
APPLICATION NO. : 11/724049
DATED : December 8, 2009
INVENTOR(S) : Jun Yoshikawa et al.

It is certified that error appears in the above-identified patent and that said Letters Patent is hereby corrected as shown below:

Columns 9-10
    *Table 1, sixth column, secondary heading*: please change "$(Sm_1Ce)Al_{11}$" to --$(Sm,Ce)Al_{11}$--

Columns 11-12
    *Table 1, seventh column, tertiary heading*: please change "$(Sm_3Ce)Al_{11}$" to --$(Sm,Ce)Al_{11}$--

*Table 2, sixth column, secondary heading*: please change "$(Sm_1Ce)Al_{11}$" to --$(Sm,Ce)Al_{11}$--

Columns 13-14
    *Table 2, sixteenth column, line 5*: please change "2.7" to --2.3--

*Table 2, fifth column, line 13*: please change "72.0" to --72.9--

Column 16
    *Line 29*: please change "300°C.," to --300°C--

*Line 44*: please change "VIJA" to --VIIA--

Column 18
    *Line 9*: please add --an-- before "aluminum"

Signed and Sealed this

Sixteenth Day of March, 2010

David J. Kappos
*Director of the United States Patent and Trademark Office*